United States Patent [19]

Barish

[11] Patent Number: 4,898,503

[45] Date of Patent: Feb. 6, 1990

[54] TWIST DRILL

[75] Inventor: Herman B. Barish, Woodland Hills, Calif.

[73] Assignee: Lockheed Corporation, Calif.

[21] Appl. No.: 215,175

[22] Filed: Jul. 5, 1988

[51] Int. Cl.$^4$ ............................................. B23B 51/02
[52] U.S. Cl. .................................. 408/230; 76/108 T
[58] Field of Search .............. 408/230, 220, 229, 228, 408/227, 144; 76/108 T; 407/36, 54

[56] References Cited

U.S. PATENT DOCUMENTS

| | | | |
|---|---|---|---|
| 984,323 | 2/1911 | Vauclain | 408/228 |
| 2,936,658 | 5/1960 | Riley | 408/230 |
| 3,387,511 | 6/1968 | Ackart, Sr. et al. | 408/230 |
| 4,116,580 | 9/1978 | Hall et al. | 408/230 |
| 4,222,690 | 9/1980 | Hosoi | 408/230 |
| 4,566,347 | 12/1985 | Barish | 408/230 |

*Primary Examiner*—Z. R. Bilinsky
*Assistant Examiner*—R. S. Schultz
*Attorney, Agent, or Firm*—L. L. Dachs

[57] ABSTRACT

The invention is a split-point twist drill for use in drilling holes in sandwich structures composed of a combination of organic matrix composite, titanium and steel. The drill (20) preferably has a web thickness (50) prior to splitting of between 23 and 27 percent of the drill diameter, a point angle (60) between 132 and 138 degrees, a web taper from the point to flute run out between 0.015 to 0.020 inch per inch, a chisel-edge angle (44) between 115 and 121 degrees and a splitting angle (70) between 127 and 137 degrees. Further important dimensions are a helix angle (24) of between 28 and 32 degrees and a lip relief angle (62) of between 10 and 14 degrees. Additional important splitting dimensions are a positive notch rake angle (74) of between 5 and 10 degrees, and an angle of the notch (72) to the drill axis between 32 and 38 degrees. Additionally, the margin width (34) should be held between 9 and 11 percent of the drill diameter, the body clearance diameter (36) held between 94 and 96 percent of the drill diameter, and the land width (30) between 59 and 61 percent of the drill diameter. The primary cutting edge rake angle (76) is 10 to 14 degrees positive and the width of the flat (78) at the corner is between 10 and 12 percent of the drill diameter. The preferred material is tungsten carbide.

8 Claims, 2 Drawing Sheets

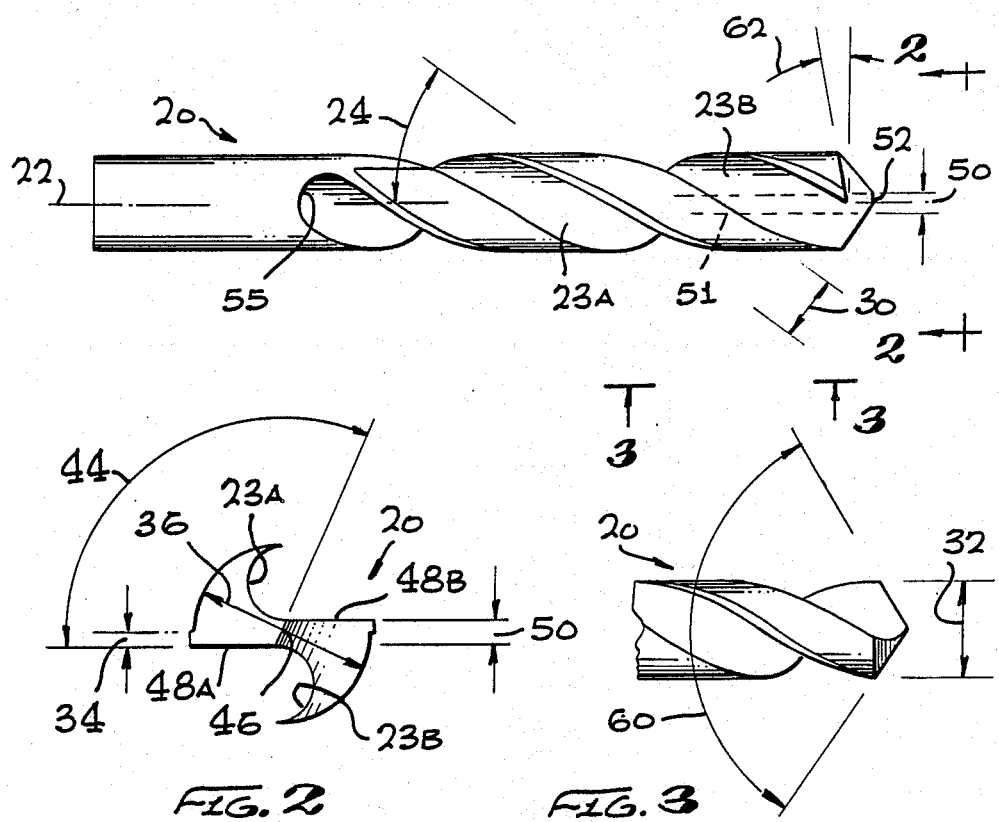

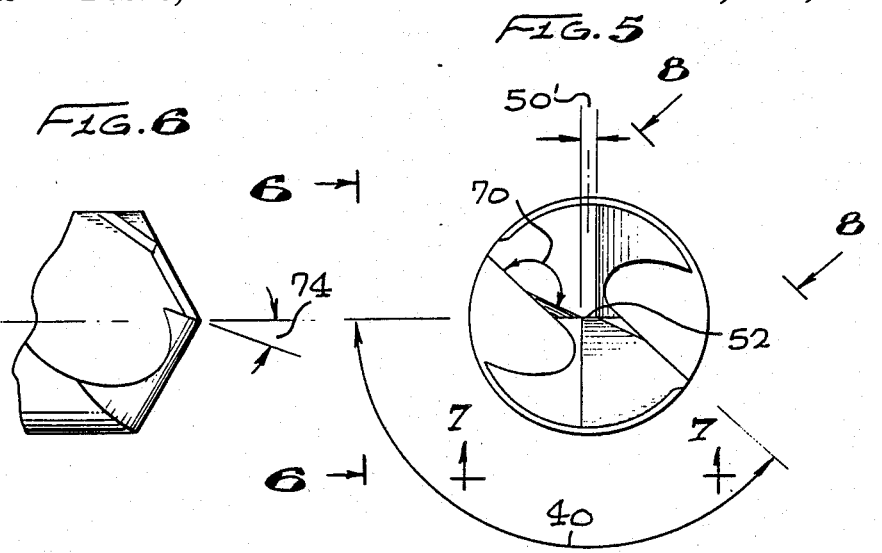
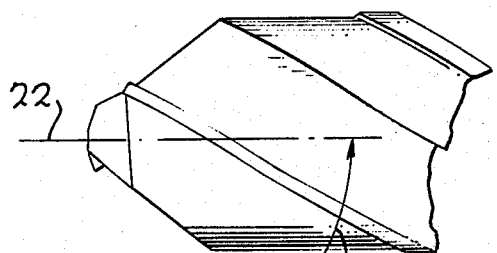
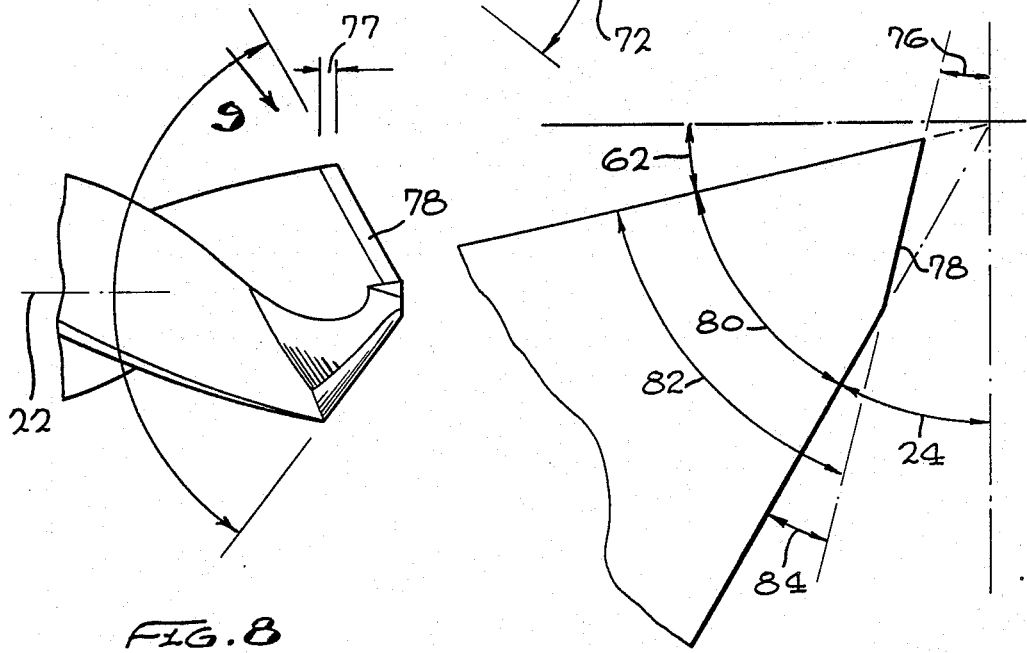

TWIST DRILL

TECHNICAL FIELD

The invention relates to drills and, more particularly, to a drill for use with structures composed of a combination of organic matrix composites, steels and titanium.

BACKGROUND INFORMATION

In the past, various attempts have been made to improve the cutting capabilities of conventional twist drills. While some of these improvements have been accepted and incorporated into drills for use with conventional metals, high strength thermal resistant materials such as titanium, have still proven to be extremely difficult to drill, especially if one is after the capability of drilling a large number of good quality holes between resharpening.

Such metals place conflicting demands upon the drill. First, there is a need for high-torsional strength to prevent the tendency of the drill to "unwind" which causes chatter and damage to the cutting edges. Second, there is a requirement for sufficient tool body at the cutting edge to dissipate the heat generated during drilling. Conventional general purpose drills have helix angles of approximately 30 degrees, thereby providing substantial tool body at the cutting edges; but they do not have adequate torsional strength and, therefore, are prone to chattering. Greatly increasing the helix angle, to 45 degrees, for example, reduces the chattering, but it also reduces the tool body at the cutting edge. Hence, cutting-edge strength and the ability to dissipate heat are also lost. Additionally, when helix angles are increased, chip flow is impaired, causing the flutes to clog, particularly when drilling metals such as aluminum, thereby nullifying the benefits of increased torsional strength.

National Aerospace Standard 907 (hereinafter abbreviated NAS 907) sets forth present day drill design philosophy for these difficult-to-drill, high-strength metals. But drills meeting the NAS 907 dimensional standards still do not provide sufficient drill life. It has been determined that even small dimensional changes, or just the tightening of tolerances on a given dimension, can radically change the effectiveness of a drill. For example, in U.S. Pat. No. 3,387,511, "Twist Drill" by W. K. Ackart, Sr, et al. (Applicant is coinventor), slight changes in the chisel-edge angle obtained a significant increase in drill life over then existing drills. In U.S. Pat. No. 4,556,347 "Split-Point Twist Drill" by H. B. Barish, a dramatic increase in drill life is obtained with a unique combination of such small changes.

Additional patents of interest include U.S. Pat. No. 4,116,580, "All Cutting Edge Drill" by R. F. Hall, et al.; U.S. Pat. No. 2,936,658, "Twist Drill" by O. L. Riley; U.S. Pat. No. 4,222,690, "Drill Having Cutting Edge with the Greatest Curvature at the Central Portion Thereof" by R. Hosoi, and 4,065,224, "Twist Drill" by K. Siddall. While the above list of patents are felt to be of interest, they are not considered to be relevant.

When drilling holes in composites such as filamentary reinforced thermosetting or thermoplastic resins matrixes such as the combination of graphite and polyetheretherkeytone (PEEK) thermoplastic or fiberglass/thermosetting epoxy the problems are different. The graphite and glass within these materials are very abrasive and rapidly wear the cutting edge of such previously mentioned drills. Thus, special eight facet drills are used which, while somewhat successful with composites, are useless with metals.

In a "sandwich" combination, such as titanium sheet, a composite such as a graphite filament reinforced PEEK and a 13-8 stainless steel sandwich structure, conventional drills are rapidly dulled and the titanium welds thereto. Also, the conventional drills for high strength metal leave burrs at the entrance and exit of the hole due to the heavy wear on the cutting edge corners. Futhermore, conventional high strength metal drills do not provide proper chip break up and the emerging chips can cause chippage or breakout of the hole walls. Thus, the hole must be drilled undersized and thereafter reamed to final dimensions.

Therefore, it is a primary object of the subject invention to provide a twist drill that can be used to drill a structure composed of a combination of titanium, steel and resin matrix composites.

Another object of the invention is to provide a twist drill that can drill a structure composed of a combination of titanium, steel and resin matrix composites that eliminates the need to ream (depending upon hole tolerance) the hole thereafter.

A further object of the invention is to provide a twist drill that can drill a structure composed of a combination of titanium, steel and resin matrix composites providing for a greater number of holes to be drilled between resharpenings than existing drills.

DISCLOSURE OF THE INVENTION

The invention is a split-point twist drill for use in drilling holes in a structure comprised of a combination of metals and resin matrix composites. The drill has a web thickness prior to splitting of between 3 and 27 percent of the drill diameter, a point angle between 132 and 138 degrees, a web taper from the point to flute run out between 0.015 to 0.020 inches per inch, a chisel-edge angle between 115 and 121 degrees. Further important dimensions are a helix angle of between 28 and 32 degrees and a lip relief angle of between 10 and 14 degrees. Important after splitting dimensions are a splitting angle between 127 and 137 degrees, a positive notch rake angle of between 5 and 10 degrees, and an angle of the notch to the drill axis of between 32 and 38 degrees. Additionally, the margin width must be held between 9 and 11 percent of the drill diameter, the body clearance diameter held between 94 and 96 percent of the drill diameter, and the land width between 59 and 61 percent of the drill diameter. Finally, the primary cutting edge rake angle is between a positive 10 to 14 degrees and the width of the flat at the corner is between 10 and 12 percent of the drill diameter. Preferably the drill is made from tungsten carbide which is tough and abrasion resistant.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

Illustrated in FIG. 1 is a side view of a two-fluted twist drill prior to splitting.

Illustrated in FIG. 2 is an end view of the drill shown in FIG. 1 along the line 2—2.

Illustrated in FIG. 3 is a partial side view of the drill illustrated in FIG. 1 along the line 3—3.

Illustrated in FIG. 4 is a partial perspective view of the drill illustrated in FIG. 1 after splitting of the point and the grinding of the primary cutting edge flat.

Illustrated in FIG. 5 is an end view of the drill illustrated in FIG. 4 along the line 5—5.

Illustrated in FIG. 6 is a partial view of the drill point illustrated in FIG. 5 along the line 6—6.

Illustrated in FIG. 7 is a partial view of the drill point illustrated in FIG. 5 along the line 7—7.

Illustrated in FIG. 8 is a partial view of the drill point illustrated in FIG. 5 along the line 8—8.

Illustrated in FIG. 9 is an enlarged view of a portion of FIG. 8 indicated by the numeral 9.

BEST MODE FOR CARRYING OUT THE INVENTION

The nomenclature of a dual-flute, split-point twist drill is quite large. Thus, a glossary of terms is provided in Table 1 which will be useful to refer to during the subsequent description of the invention.

TABLE 1 - GLOSSARY OF TERMS

AXIS—The imaginary straight line that forms the longitudinal center line of the drill.

BODY DIAMETER CLEARANCE—That portion of the land that has been cut away so it will not rub against the walls of the hole.

CHISEL EDGE—the edge at the end of the web that connects the cutting lips.

CHISEL EDGE ANGLE—The included angle between the chisel edge and the cutting lip, as viewed from the end of the drill.

DRILL DIAMETER—The diameter over the margins of the drill measured at the point.

FLUTES—Helical grooves cut or formed in the body of the drill to provide cutting lips, to permit removal of chips and allow cutting fluid to reach the cutting lips.

FLUTE LENGTH—The length from the outer corners of the cutting lips to the extreme back end of the flutes.

HEEL—The trailing edge of the land.

HELIX ANGLE—The angle made by the leading edge of the land with a plane containing the axis of the drill.

LAND—The peripheral portion of the body between adjacent flutes.

LAND WIDTH—The distance between the leading edge and the heel of the land measured at a right angle to the leading edge.

LIPS—The cutting edges of a two-flute drill extending from the chisel edge to the periphery.

LIP RELIEF ANGLE—The axial relief at the outer corner of the lip. It is measured by projection into a plane tangent to the periphery at the outer corner of the lip. The lip relief angle is usually measured across the margin of the twist drill.

MARGIN—The cylindrical portion of the land which is not cut away to provide clearance.

POINT—The cutting end of a drill, made up of the ends of the lands and the web. In form, it resembles a cone, but departs from a true cone to furnish clearance behind the cutting lips.

POINT ANGLE—The angle included between the cutting lips projected upon a plane parallel to the drill axis and parallel to the two cutting lips.

SECONDARY CUTTING EDGE—The cutting edge formed by the intersection of the face of the notch with the relieved surface of the point, resulting in partial removal of the chisel edge.

WEB—The central portion of the body that joins the lands. The extreme end of the web forms the chisel edge on a two-flute drill.

WEB THICKNESS—The thickness of the web at the point, unless another specific location is indicated.

WEB THICKNESS AFTER NOTCHING—The thickness of the remaining web at the point after notching.

PRIMARY CUTTING EDGE FLAT—A grinding cut parallel to the original primary cutting edge ("K" land or dub).

PRIMARY CUTTING EDGE RAKE ANGLE—The angle that the cutting edge flat makes to the longitudinal axis of the drill.

Illustrated in FIGS. 1 through 3 is a two-fluted twist drill prior to splitting, generally designated by numeral 20. It is important to discuss the drill dimensions prior to a discussion of splitting because 27 several critical dimensions are changed after splitting the point. This information is necessary in order to manufacture the drill and, furthermore, it makes the remaining FIGS. 4-9 easier to understant. The drill 20 has longitudinal axis 22 and incorporates two flutes, 23A and 23B, at a helix angle 24 which is from 28 degrees and 32 degrees to the longitudinal axis 22. The 28 degrees to 32 degrees degree helix angle increases torsional stiffness 10 percent over the commonly used 20 degrees to 23 degrees helix angle. The increased torsional stiffness prevents and/or resists "unwinding" of the drill while machining, which would result in chattering, chippage of cutting edges and corners, premature wear, chip welding due to heat, poor drill life and poor hole quality. The land width 30 is maintained at 59 and 61 percent of the drill diameter 32. This design feature strengthens the cutting edge support and equalizes cutting action. It also provides adequate flute width for egress of chips. The margin width 34 is maintained between 9 to 11 percent of the drill diameter which is lower then the usual 11 to 15 percent normally used. However, it has proved sufficient to minimize welding to the cutting edges while drilling thermally resistant metals such as titanium. The body clearance diameter 36 is maintained at between 94 and 96 percent of the drill diameter providing adequate backup support and torsional stiffness to the cutting edges preventing premature corner wear. The chisel-edge angle 44, i.e., the angle between the chisel edge 46 and the cutting lips 48A and 48B, is between 115 to 121 degrees. The web thickness 50 at the point 52 (before splitting) is 23 to 27 percent of the drill diameter, indicated by numeral 51, and tapers from the point 52 to flute run out 55 at a rate of 0.015 to 0.020 inches per inch, both of which increase torsional stiffness. The point angle 60 is between 132 and 138 degrees. Finally, the lip relief angle 62 is between 10 and 14 degrees.

Still referring to FIGS. 1 through 3 and, additionally, to FIGS. 4 through 9, which illustrate the drill configuration after splitting, indicated by numeral 20', it can be seen that the chisel edge thickness 50' at the point 52, after splitting, has been considerably reduced, to a dimension of 0.004 to 0.008 inches (FIG. 5). The splitting angle 70 (secondary cutting edge angle) is 127 and 137 degrees. The angle 12 of a notch 73 with respect to the drill axis 22 is 32 to 38 degrees starting at the point 52 (FIG. 7). The notch rake angle 74 is positive and lies between 5 and 10 degrees (FIG. 6) as can be seen from the above description and the FIGS. 4–9, the notch 73 is an angled flat cut starting at the point 52 of the drill at the center line and angles away therefrom defined by an angle 74 and chisel edge thickness 50'.

The primary cutting edge rake angle 76 is 10 to 14 degrees positive and the width 77 of the flat 78 at the corner is between 10 and 12 percent of the drill diameter 32. These design features strengthen the cutting edge corners which, in turn, reduces corner breakdown, chippage, welding, increasing drill life and breaks up the chips for easier egress thereof. Referring particularly to FIG. 9, it can be seen that without this feature, the corner angle for a 30 degrees helix angle twist drill indicated by numeral 80, would be normally 48 degrees. With the primary cutting edge flat incorporated., the corner angle indicated by numeral 82, is nominally 66 degrees (angle 80 which is nominally 48 degrees and angle 84 which is nominally 18 degrees) Thus, not being as sharp, the cutting edge is less prone to breakdown. Finally, web concentricity to the drill diameter 32 should be less than 0.002 inch and the alignment of the secondary cutting edges should be 0.002 total. The drill should be made from micrographic tungsten carbide steel; for example, VR-52 micro-grain tungsten carbide manufactured by VR/Wesson Co, Plantsville, Conn. Tungsten Carbide has proved to be a very abrasive resistant drill material.

Unfortunately, there are presently no standards such as the NAS 907 for High speed steel and steel/cobalt drills for Tungsten carbide twist drills and each manufacturer has their own specifications or manufacturers them to customer specifications.

TEST RESULTS

The drill was successfully used to drill holes in the following sandwich combinations:

| | | | | |
|---|---|---|---|---|
| 1. | Graphite Peek | Fiberglass Epoxy | Graphite Peek | (0.247" thick) |
| 2. | Titanium | Graphite Peek | Titanium | (0.200" thick) |
| 3. | Graphite Peek | Fiberglass Epoxy | 13-8 Steel and Titanium | (0.535" thick) |
| 4. | Graphite Peek | Titanium | | (0.468" thick) |
| 5. | Fiberglass | Graphite | | (0.192" thick) |

| -continued | |
|---|---|
| Epoxy | Peek |

Entrance and exit hole burrs were minimum to non-existant and the holes did not require reaming to achieve proper hole finish. Standard NAS 907 drills, 8 facet drills for composites and applicants previously mentioned patented drill (U.S. Pat. No. 4,556,347 "Split-Point Twist Drill" by H. B. Barish) were not able to drill holes without requiring subsequent deburing or reaming to achieve proper hole finish.

While the invention has been described with respect to a certain specific embodiment thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

Industrial Applicability

The drill is useful for drilling holes in structures composed of a combination of titanium, steel and resin matrix composites.

I claim:
1. A split-point, two-fluted twist drill having:
   a helix angle of the flutes of between 28 and 32 degrees;
   a web thickness at the point prior to splitting of between 23 and 27 percent of the drill diameter;
   a point angle of between 132 and 138 degrees;
   a web taper from said point to flute run out of 0.015 to 0.020 inches per inch;
   a chisel-edge angle of between 115 and 121 degrees;
   a splitting angle of between 127 and 137 degrees;
   a primary cutting edge rake angle of between 10 to 14 degrees positive; and
   a flat at the corner of the cutting edge rake of between 10 and 12 percent of the drill diameter.
2. The drill as set forth in claim 1 further having: a positive notch rake angle of between 5 and 10 degrees.
3. The drill as set forth in claim 2 further having an angle of notch to said drill axis of between 32 and 38 degrees.
4. The drill as set forth in claim 3 further having a land width of between 59 and 61 percent of said drill diameter.
5. The drill as set forth in claim 4 further having a lip relief angle of between 10 and 14 degrees.
6. The drill as set forth in claim 5 further having a body clearance diameter of between 94 and 96 percent of said drill diameter.
7. The drill as set forth in claim 6 further having a margin width of between 9 and 11 percent of said drill diameter.
8. The drill as set forth in claim 7 wherein the drill is made of tungsten carbide.

* * * * *